Oct. 6, 1953  C. W. KLUG  2,654,865
THERMALLY ACTUATED VOLTAGE INDICATOR
Filed March 16, 1950
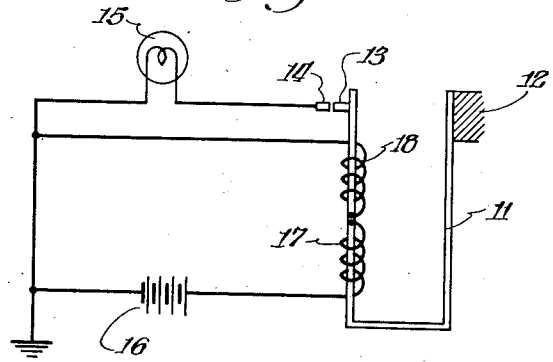
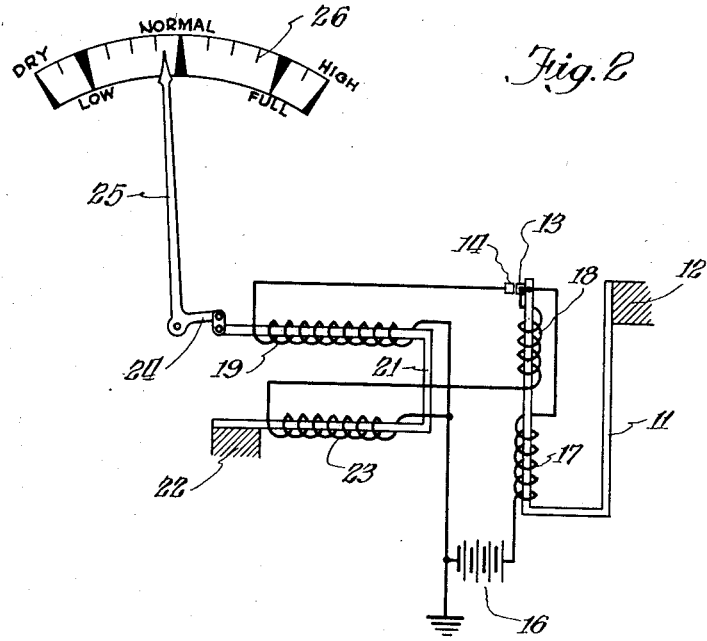
Inventor:
Charles W. Klug.
By: Alois W. Graf
Attorney.

Patented Oct. 6, 1953

2,654,865

UNITED STATES PATENT OFFICE 2,654,865

THERMALLY ACTUATED VOLTAGE INDICATOR

Charles W. Klug, Chicago, Ill.

Application March 16, 1950, Serial No. 150,013

3 Claims. (Cl. 324—106)

The present invention relates to a thermally actuated voltage indicator more particularly suited to giving indication of the battery charge of a storage battery in an automotive vehicle while the generator is supplying current to the battery.

One of the greatest failures of the automotive vehicle is caused by a discharged battery and hence it is desirable to maintain a fully charged battery at all times. It of course is known that a fully charged battery has a higher voltage between its terminals while being charged even though the charging rate is lower than a partially charged battery but subject to higher charging rates.

As the battery is accumulating a charge the battery voltage will increase at a rather uniform rate during the charging period with a somewhat increased voltage rising as the battery approaches full charge.

It is therefore an object of the present invention to provide a relatively simple device for indicating the charge of a storage battery while the battery is receiving charging current from a generator.

A further object of the present invention is to provide a thermally actuated voltage indicator and application to show the relative charge of a storage battery.

A further object of the present invention is to provide a thermally actuated voltage meter having full scale deflection through a relatively small portion of the full range of voltage values.

Still another object of the present invention is to provide means for giving a relative indication of the battery condition of charge by a periodical flashing signal lamp wherein the flashes increase in periodicity as the battery voltage decreases.

Other and further objects of the present invention subsequently will become apparent by referring to the description taken in conjunction with the accompanying drawings wherein:

Fig. 1 is a circuit diagram illustrating the principles of the present invention as applied to a flashing signal voltage indicator of the thermally actuated type; and Fig. 2 is a circuit diagram and schematic representation of a thermally actuated voltage meter.

Referring to Fig. 1 of the drawing, there has been represented an ambient temperature compensated bimetallic element 11, which in its most usual form has a U-shape. One leg of the U-shaped bimetallic element 11 is affixed to a stationary surface at 12, and the other leg of the bimetallic element carries a movable contact 13.

The movable contact 13 is adapted to engage a fixed contact 14 which is connected in circuit with a signal lamp 15, having one terminal grounded and connected to the ground terminal of a storage battery 16. The other terminal of the storage battery 16 is connected to a heating winding 17 which has its other terminal connected to the contact 13, through one leg of the bimetallic element 11. The contact 13 and the leg of the bimetallic element 11 are connected together to one terminal of a second heating element 18 having its remaining terminal connected to the ground terminal of the battery.

The resistance for heating effects of the heating elements 17 and 18 are selected as to provide a desired mode of operation. In particular the heating element 18 has a resistance value appreciably greater than the resistance value of the signal lamp 15.

Assuming a fully charged storage battery 16, the voltage supplied to the heating elements 17 and 18 which are in series across the battery 16, will be sufficient to maintain the contacts 13 and 14 separated or at least separated for long time intervals. If now however, it is assumed that the battery voltage 16 is less than that obtained normally when the battery is receiving charging current, because the battery is not fully charged the energy supplied to the heating elements 17 and 18 will be insufficient to maintain the contacts 13 and 14 separated for any long time intervals. Thus periodically the contacts 13 and 14 will close so that current flows to the lamp 15 thereby providing increased current flow through the heater 17 which builds up the heating sufficiently to again bring about separation of the contacts 13 and 14.

As the charging of the battery 16 drops the terminal voltage likewise decreases so that the frequency with which the contacts 13 and 14 close also increases, and hence in one embodiment the signal lamp 15 flashed at the rate of about two times per minute when the battery was fully charged and at a rate of about 28 times per minute when the battery 16 was at low charge or in substantially discharged condition.

It therefore should be apparent to those skilled in the art that the thermally actuated voltage indicator represented in Fig. 1 provides a relatively simple visual indication for use on automotive vehicles which is simple and economical to manufacture and which can be comprehended by the user without referring to any particular indicia on an instrument scale.

Wherever it may nevertheless be held to be desirable to provide an indication by means of a pointer and dial, the arrangement shown in Fig. 1 may be modified as illustrated in Fig. 2. For the purpose of indicating similar components, similar reference marks have been applied to elements similar to that shown in Fig. 1.

In lieu of the circuit for the lamp 15, there is provided a resistance heating element 19 which is wound about one leg of an ambient temperature compensated bimetallic element 21. As is common in the art, the ambient temperature compensated bimetallic element 21 may have a U-shape so that one leg is secured to a fixed point 22.

Another heater winding 23 has been shown as being wound about the other leg of the bimetallic element 21. The heating element 23 is connected between the ground terminal of the battery 16 and one terminal of the heater winding 18 of the bimetallic element 11. One leg of the bimetallic element 21 engages a lever 24 which actuates a pointer 25 cooperating with an instrument scale 26.

The instrument scale 26 covers a relatively small portion of the full voltage range of the storage battery 16. Thus in one embodiment the scale 26 covers the range from 5.8 to 7.2 volts.

In operation, the system shown in Fig. 2 for a fully charged battery 16, produces infrequent closing of the contacts 14 and 13, so that the pointer 25 is positioned near the high end of the scale 26. If the battery voltage 16 is below that of a fully charged battery the contacts 13 and 14 close at lesser time intervals so as to supply more heat through the winding 19 thereby to move the pointer 25 toward the other end of the scale 26.

The desired degree of sensitivity is obtained by proper proportioning of the resistance heating values on the heaters 17 and 18. The heating elements 19 and 23 likewise are properly proportioned in order to obtain the desired mode of operation, and generally are so arranged that when both heaters are in circuit, the heater 23 produces a smaller heating effect than the heater 19.

In the present automotive vehicle an ammeter is frequently provided to indicate whether or not charging current is being supplied to a battery. Where however, a battery is in a well charged condition, the current supplied is relatively low. The other times when the charge of the battery is low, the current supplied is now high but this is confusing to the average automobile owner since he fails to appreciate the purpose and function of the circuit and volt relays of the voltage indicator.

It therefore would be less confusing and of much greater value to provide an instrument of the type employing an arrangement such as represented by the pointer 25, and the scale 26 of Fig. 2. This arrangement has the advantage of spreading the indication of a relatively small voltage charge over a scale which by conventional instruments would be entirely impractical.

The scale 26 therefore may be labeled as indicated in Fig. 2, or may be calibrated in actual voltage averages.

While for the purpose of illustrating and describing the present invention certain preferred improvements have been indicated in the schematic and diagrammatic representations of the drawings, it is to be understood that such other arrangements are contemplated as may be commensurate with the spirit and scope of the invention as set forth in the accompanying claims.

I claim:

1. The combination comprising an ambient temperature compensated bimetallic element having a heating element arranged to be continuously energized from a voltage source, a second heating element for said bimetallic element arranged to be normally connected in series with said first heating element, and a shunt circuit including a pair of contacts controlled by said bimetallic element, said second heating element being arranged to be shunted thereby at a periodicity proportional to a decrease in voltage of the voltage source.

2. The combination comprising an ambient temperature compensated bimetallic element arranged to control a pair of electrical contacts, a source of variable voltage, a heating element mounted on said bimetallic element and connected between said source of voltage and one of said contacts, a second heating element for said bimetallic element being connected between said contact and the other terminal of said source of voltage, a thermally actuated indicating instrument having a pointer controlled by a U-shaped bimetallic element having heater windings on each leg thereof, one of said heating elements being connected between the other of said electrical contacts and one terminal of said source of voltage, the other of said heating elements being connected in series between one terminal of said source of voltage and the second mentioned heating element associated with said first mentioned bimetallic element.

3. The combination comprising an ambient temperature compensated bimetallic element provided with a plurality of series connected heating elements, a source of variable voltage, a pair of contacts controlled by said bimetallic elements, one of said contacts being connected to the common juncture between said heating elements and one terminal of said source of voltage, the remaining terminals of said heating elements being connected to opposite terminals of said source of voltage, and an electric circuit connected between the other of said contacts and said source of voltage in parallel with one of said heating elements thereby to produce increased current flowing through the other of said heating elements proportional to a decrease in voltage of said source.

CHARLES W. KLUG.

References Cited in the file of this patent
UNITED STATES PATENTS

| Number | Name | Date |
|---|---|---|
| 1,401,049 | Conklin | Dec. 20, 1921 |